United States Patent
Yezersky et al.

(10) Patent No.: US 7,202,775 B2
(45) Date of Patent: Apr. 10, 2007

(54) KEY FOB WITH REMOTE CONTROL FUNCTIONS

(75) Inventors: Grigory Yezersky, Farmington Hills, MI (US); Gerald Cilibraise, Livonia, MI (US); Stephen J Buckley, Movi, MI (US); Nashat K Abdel Jalil, Auburn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 116 days.

(21) Appl. No.: 10/766,152

(22) Filed: Jan. 28, 2004

(65) Prior Publication Data

US 2004/0222899 A1 Nov. 11, 2004

Related U.S. Application Data

(60) Provisional application No. 60/469,232, filed on May 9, 2003.

(51) Int. Cl.
*B60R 25/10* (2006.01)

(52) U.S. Cl. .............................. 340/426.1; 340/825.72; 340/426.14; 307/10.1; 341/175; 704/275

(58) Field of Classification Search ............. 340/426.1, 340/426.26, 426.13–426.17; 307/10.1, 10.2
See application file for complete search history.

(56) References Cited

U.S. PATENT DOCUMENTS

| | | | | |
|---|---|---|---|---|
| 5,583,485 A | * | 12/1996 | Van Lente et al. | 340/525 |
| 5,777,571 A | * | 7/1998 | Chuang | 341/176 |
| 5,937,065 A | * | 8/1999 | Simon et al. | 380/262 |
| 5,940,007 A | * | 8/1999 | Brinkmeyer et al. | 340/825.69 |
| 6,107,914 A | * | 8/2000 | Greene | 340/426.25 |
| 6,140,939 A | * | 10/2000 | Flick | 340/825.69 |
| 6,144,114 A | * | 11/2000 | Chutorash | 307/10.5 |
| 6,243,022 B1 | * | 6/2001 | Furukawa | 340/825.72 |
| 6,249,216 B1 | * | 6/2001 | Flick | 340/426.14 |
| 6,346,876 B1 | * | 2/2002 | Flick | 340/426.13 |
| 6,424,056 B1 | * | 7/2002 | Irvin | 307/10.1 |
| 6,496,107 B1 | * | 12/2002 | Himmelstein | 340/426.1 |
| 6,570,486 B1 | * | 5/2003 | Simon et al. | 340/5.1 |
| 6,724,322 B2 | * | 4/2004 | Tang et al. | 340/989 |
| 6,873,824 B2 | * | 3/2005 | Flick | 455/41.2 |
| 2002/0067245 A1 | * | 6/2002 | Campbell et al. | 340/5.64 |
| 2002/0109580 A1 | * | 8/2002 | Shreve et al. | 340/5.61 |
| 2003/0117261 A1 | * | 6/2003 | Gunsch | 340/5.25 |
| 2003/0231550 A1 | * | 12/2003 | Macfarlane | 367/198 |
| 2004/0119580 A1 | * | 6/2004 | Spielman et al. | 340/5.52 |
| 2004/0143437 A1 | * | 7/2004 | Hanood et al. | 704/258 |

FOREIGN PATENT DOCUMENTS

DE 19916308 A1 * 10/2000

* cited by examiner

*Primary Examiner*—Daniel Wu
*Assistant Examiner*—Eric M. Blount
(74) *Attorney, Agent, or Firm*—Ralph E. Smith

(57) ABSTRACT

A remote control system for a vehicle. The system has a fob with a microphone for receiving audible commands and a radio frequency transmitter for transmitting the commands at a radio frequency via a fob antenna. A receiver for positioning in the vehicle has an antenna for receiving the commands at the radio frequency, a demodulator for recovering the commands, a processor for decoding the recovered commands according to vehicle configuration information, and a network interface for controlling a vehicle system in accordance with the recovered commands and the vehicle configuration information.

15 Claims, 2 Drawing Sheets

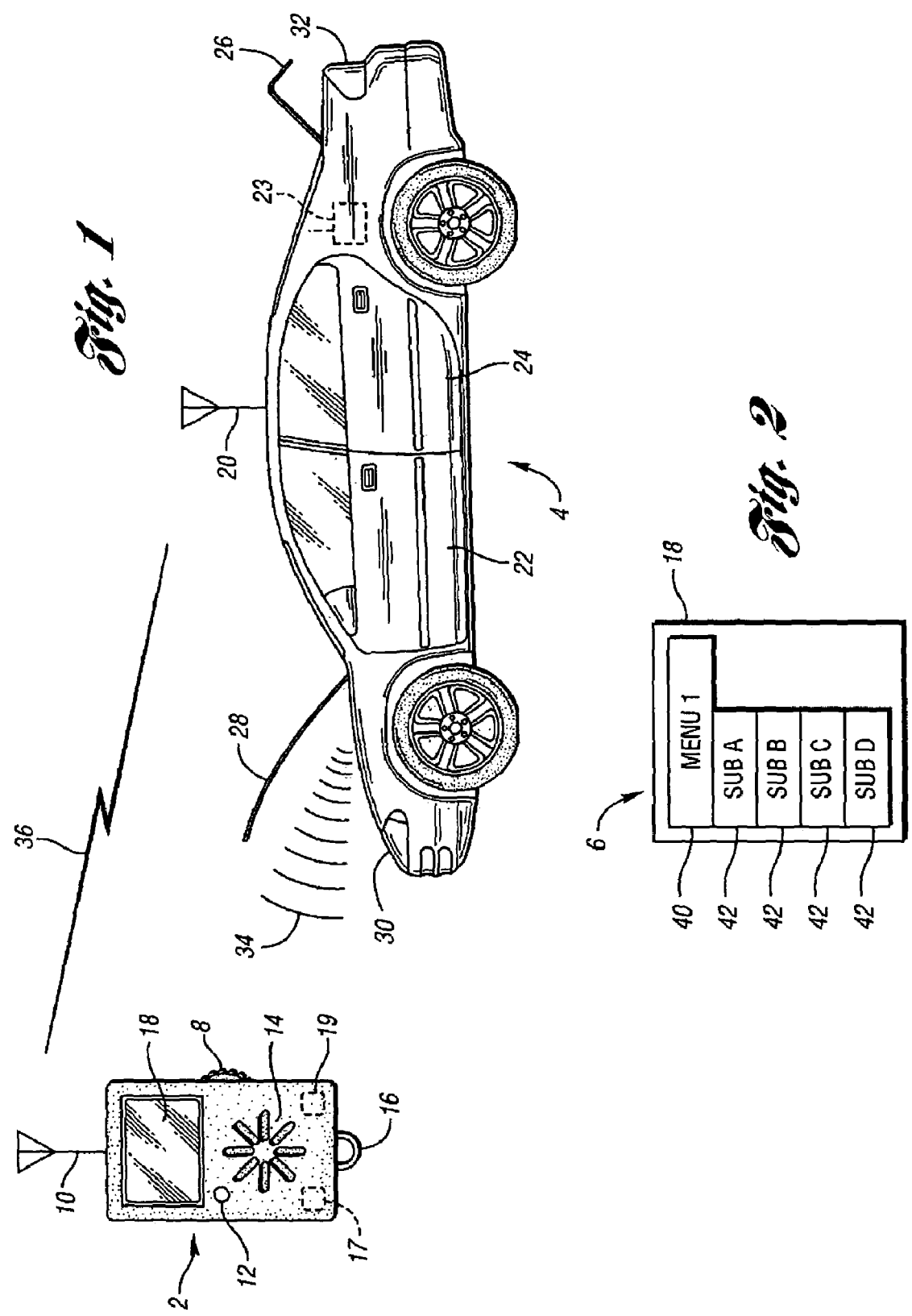

KEY FOB WITH REMOTE CONTROL FUNCTIONS

PRIORITY CLAIM

This application claims the priority of U.S. provisional application No. 60/469,232, filed May 9, 2003.

FIELD OF THE INVENTION

This invention relates generally to remote key less entry devices, and more particularly to such devices providing control over a plurality of functions.

BACKGROUND OF THE INVENTION

Remote key less entry fobs are generally used to remotely lock and unlock vehicle doors. As an example, a fob may have a button and a transmitter. Upon pushing the button, the transmitter sends a signal to a vehicle equipped with a receiver, and the receiver subsequently causes the vehicle door to unlock. One issue with such a system is that it is possible to inadvertently press the control button and unknowingly unlock the vehicle. Another issue with such a system is that many vehicles now have multiple functions which may be controlled by the remote fob. Examples of such functions include power sliding doors, sun roofs, alarm systems, trunks, lift gates, and the vehicle doors. Implementing the increased functionality with a button-based fob causes challenging design decisions to be made between the number of buttons, size of the fob, size of the buttons, and button press sequence, press duration and/or press force needed to execute each available fob function. Adding to the design considerations is the issue of having a particular vehicle with varying feature content. For example, a particular vehicle model may be offered with a remote power trunk as an option. The fob designer must then decide between producing different fobs for vehicles with and without the power trunk, or producing a single fob design and altering the button functions between models with and without the power trunk.

BRIEF SUMMARY OF THE INVENTION

Accordingly, one aspect of the present invention is to provide a fob having diminished dependence on buttons for selecting functions.

It is yet another aspect of the invention to provide a fob with increased control capability in combination with an easy to use interface.

It is yet one more aspect of the invention to provide a single fob capable of controlling vehicles of various feature content.

In accordance with these aspects of the invention, a remote control system for a vehicle is provided. The system has a fob with a microphone for receiving audible commands and a radio frequency transmitter for transmitting the commands at a radio frequency via a fob antenna. A receiver for positioning in the vehicle has an antenna for receiving the commands at the radio frequency, a demodulator for recovering the commands, a processor for decoding the recovered commands according to vehicle configuration information, and a network interface for controlling a vehicle system in accordance with the recovered commands and the vehicle configuration information.

BRIEF DESCRIPTION OF THE DRAWINGS

FIG. 1 shows a fob in combination with a vehicle;
FIG. 2 shows a menu screen for a fob.

DETAILED DESCRIPTION OF THE PREFERRED EMBODIMENTS

Figure 3:
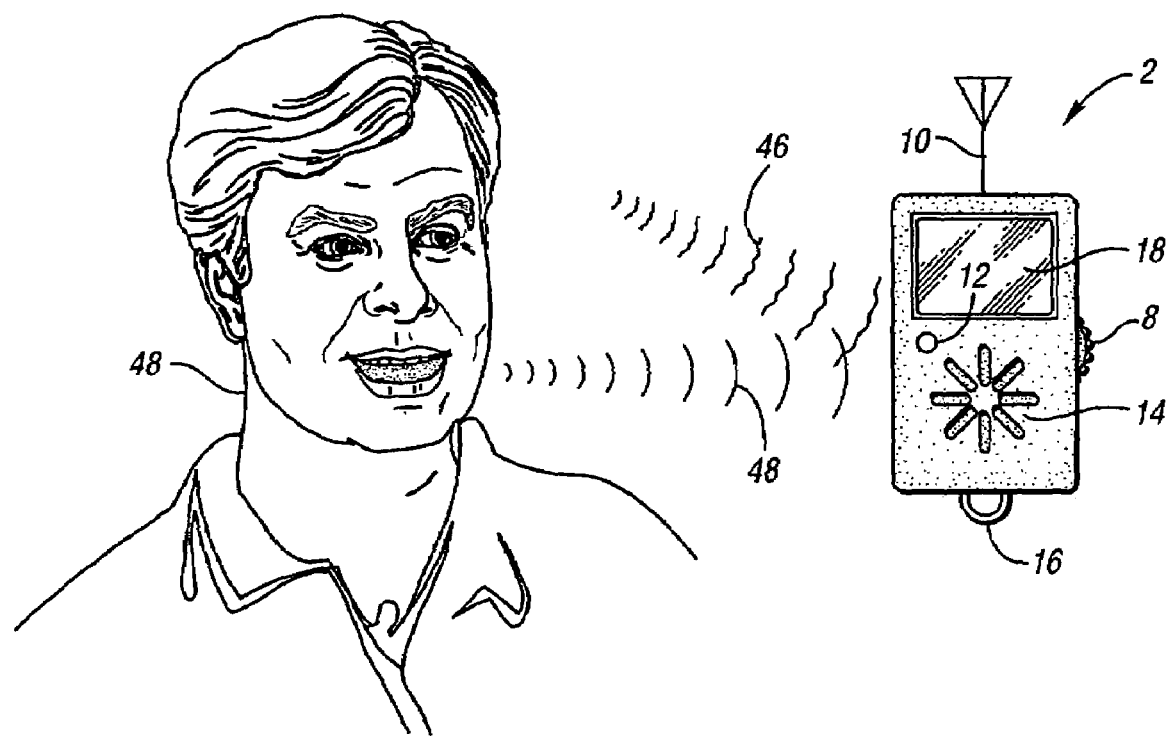
FIG. 3 shows a fob user interacting with a fob.

FIG. 1 shows a fob 2 for using with a vehicle 4. In a first embodiment, the fob 2 has a microphone 12 for receiving spoken commands from a fob user. The spoken commands are interpreted by a microcontroller 17 or digital signal processor, which executes instructions according to a predetermined program. When the controller 17 recognizes a valid command, it causes a transmitter or transceiver 19 to send control signals 36 via an antenna 10. The antenna 10 may be located internal or external to the fob housing. The fob 2 may also include a display 18 and a speaker 14 to provide visual and audio feedback, respectively, to the user. An attachment point 16 may be provided for attaching items to the fob 2.

The vehicle 4 has several functions that may be controlled by the fob 2. By way of non-limiting example, the vehicle depicted has an opening hood 28, a front door 22, a rearward hinged or sliding door 24, a trunk or lift gate 26, head lamps 30, tail lamps 32, and an alarm tone 34.

In operation with a fob of the first embodiment, the microcontroller 17 determines when a command signal 36 should be transmitted to the vehicle 4. The vehicle antenna 20 receives the command signal and sends it to a receiver 23 for processing. The receiver then causes action to be taken in correspondence with the received command signal. For example, if the fob 2 determines that the fob user would like to open the trunk lid 26, then the fob sends a command signal 36 corresponding to a trunk opening function. The vehicle will receive the command signal 36, via the antenna 20 and receiver 23, and effect the opening of the trunk lid 26. Similarly, the fob and vehicle may work together to operate the other functions of the vehicle 4.

The fob 2 receives spoken commands from the user. The digital processor 17 parses the user's speech until a command is recognized from a predetermined set of control words. For example, the processor may be programmed to recognize the spoken commands "OPEN TRUNK", "LIGHTS ON", LIGHTS OFF", and "PANIC". When the processor 17 recognizes a command, an appropriate signal is transmitted to the vehicle.

When the fob includes a display 18, the display may be used to include a system for providing feedback or prompts to a user. As the number of control functions of the fob increases, it becomes increasingly difficult for the user to remember all of the control words. To eliminate the memory burden on the user, the display 18 may include a menu 6 as shown in FIG. 2. In an example embodiment, the menu contains a plurality of main menu items 40 correlating to controlled parts of the vehicle. Each of the main menu items would display the command word to be spoken to effect control of that part of the vehicle. Examples of such main menu items may include "HEAD LAMPS", "TRUNK", "HOOD", "ALARM", etc. Once the user speaks the command word and it is recognized by the fob, the menu 6 then displays submenu items 42 correlating to actions that may be taken by the chosen vehicle part. Some examples of command words correlating to actions include "OPEN", "CLOSE", "ARM", "DISARM", etc. In the example menu structure the submenu command words are generally verbs, whereas the main menu command words are generally nouns.

It is also possible to reverse the order of command words by placing the verb higher in the hierarchy. Such a menu structure could also emulate a dialogue between the user and fob such as, "OPEN."

"OPEN WHAT?"

"DOOR.", etc.

The display may also be used to display information about the vehicle. For example, if the vehicle is equipped with a transmitter, then the fob may be equipped with a transceiver for receiving signals from the vehicle in addition to transmitting to the vehicle. The fob could then communicate data from the received signals to the user via the display 18 or the speaker 14. In an exemplary application of such a big-directional system, the user would cause the fob to request the vehicle to transmit information relating to the temperature of its passenger compartment. Upon receiving the temperature information, the fob would communicate the temperature to the user. The temperature data may be particularly useful to the user if the vehicle is also equipped with an engine starter that may be operated via the fob. Depending upon the temperature of the passenger compartment, the user may decide whether to start the vehicle and remotely adjust the temperature of the passenger compartment to a comfortable level for later occupancy.

Turning to FIG. 3, a fob user 48 is shown giving spoken commands 44 to a fob 2. The fob 2 receives the spoken commands 44 via microphone 12. In addition to receiving the spoken commands, the microphone also inadvertently receives ambient noise 46 from sources outside of the user's control. To prevent the processor 19 from mistakenly interpreting ambient noise as a command word, command words should be selected such that they are readily distinguishable from ambient noise as well as each other. To prevent accidental voice recognition from causing the transmitter to transmit command signals 36 to the vehicle it may also be desirable to activate the transmitter 19 only while the auxiliary control 8 is activated. An exception may be made for some functions, such as a panic function.

In an alternative embodiment, the fob 2 receives commands from a user. The user may enter the commands via a microphone 12 or auxiliary interface 8. Once received from the user, the fob retransmits the commands to the vehicle via the antenna 10. The simply retransmitted commands may be in analog form or, alternatively, in digitally encoded form with the digital encoding taking place in the processor 17. In such an alternative embodiment, the vehicle is equipped with a receiver 23' for receiving, recognizing, and effecting action based upon the commands. Such an arrangement allows a common fob to be used regardless of the vehicle's option content.

Figure 4:
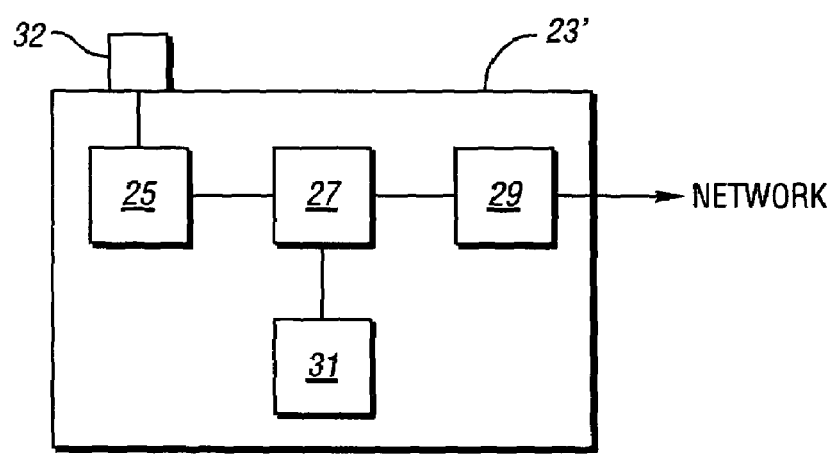
FIG. 4 shows a vehicle receiver for using with a fob.

As shown in FIG. 4, the vehicle receiver 23' has an input 33 for receiving signals from the vehicle antenna 20. The signals are demodulated by demodulator 25 and then provided to processor 27 for decoding. Processor 27 decodes the signals according to vehicle configuration information 31. The configuration information may be programmed into a memory within the receiver 23', or communicated to the decoding processor via an in-vehicle network.

Upon receiving the command from the fob, the processor 27 attempts to decode it according to the vehicle configuration. If the fob user has transmitted a command, or series of commands, applicable to the available option content of the vehicle, then the receiver will effect the desired action in a manner similar to the first embodiment. Conversely, if the receiver 23' determines from the vehicle configuration information 31 that the vehicle does not have the required function to execute the user's command, then the receiver will not effect the function. Furthermore, the vehicle may be equipped with a transmitter or transceiver to communicate back to the fob that the requested function could not be executed and the reason. For example, if the vehicle is not equipped with a remote power liftgate, and the user requests the remote power liftgate to be opened, the receiver 23' would refer to the vehicle configuration information 31 to determine whether the vehicle has a remote power liftgate. Since it does not, the processor 27 could cause the vehicle to transmit the fact back to the user.

The receivers 23 and 23' may also be equipped with a network interface 29 for allowing communication between the processor 27 and other control points in the vehicle. Such communication allows the processor to effect action on a vehicle component without the receiver having actual electrical power connections to the controlled component.

It is intended that the invention not be limited to the particular embodiment illustrated by the drawings and described in this specification as the best mode presently contemplated for carrying out this invention, but that the invention will include any embodiment falling within the description of the appended claims.

What is claimed is:

1. A remote control system for a vehicle model having variable feature content, the system comprising:

a fob having a microphone for receiving audible commands and a radio frequency transmitter for transmitting said commands at a radio frequency via a fob antenna;

a receiver for positioning in a specific vehicle having features preselected from the variable feature content, said receiver having an antenna for receiving one of said commands at a radio frequency, a demodulator for recovering said one command and a processor for decoding said recovered one command and determining if the preselected features are compatible with the one command, and said processor for notifying said fob that said preselected features are not available based on incompatibility between said preselected features and said one command; and a network interface for controlling a vehicle system in accordance with said recovered one command only when the preselected features are compatible with the one command.

2. The system of claim 1 wherein information specifying the preselected features is stored in a memory connected to said processor.

3. The system of claim 2 wherein said information is communicated to said processor via said network interface.

4. The system of claim 1 further comprising a transmitter for positioning in the vehicle, said transmitter transmitting result information to a receiver located in said fob, said fob further comprising an output device connected to said receiver wherein said output device communicates said result information to a fob user.

5. The system of claim 4 wherein said output device comprises a display screen.

6. The system of claim 4 wherein said output device comprises a speaker.

7. A method for remotely controlling a vehicle system in a vehicle model having variable feature content, the method comprising:

transmitting a command via a voice modulated RF signal to a specific vehicle having features preselected from the variable feature content;

receiving and demodulating said RF signal to recover said command;

decoding said command and determining if the preselected features are compatible with the command;

notifying a user that said preselected features are not available based on incompatibility between said preselected features and said one command;

and controlling the vehicle system in accordance with said command only when the preselected features are compatible with the command.

8. A remote control system for controlling a vehicle system in a vehicle model having a variable feature content, said remote control system comprising:

a means for receiving an audible command;

a radio frequency (RF) transmitting means for sending an RF signal modulated in accordance with said audible command to a vehicle having features preselected from the variable feature content, wherein said RF transmitting means is compatible with multiple vehicles having differing vehicle features;

an RF receiving means for receiving and demodulating said RF signal and obtaining a command signal therefrom;

a processor means for decoding said command signal and determining if the preselected features are compatible with the command signal; and a network interface for controlling the vehicle system in accordance with said command signal only when the preselected features are compatible with the command.

9. The remote control system of claim 8 wherein said RF signal is modulated in a digital mode.

10. The remote control system of claim 8 wherein said RF signal is modulated in an analog mode.

11. The system of claim 8 wherein information specifying the preselected features is stored in a memory connected to said processor means.

12. The system of claim 11 wherein said information is communicated to said processor means via said network interface.

13. The system of claim 8 further comprising a transmitter means, said transmitter means transmitting result information to a fob receiver means located in a fob, said fob further comprising an output means connected to said receiver wherein said output means annunciates said result information.

14. The system of claim 13 wherein said output means comprises a display screen.

15. A remote control system for a vehicle model having variable feature content, the system comprising:

a fob having a microphone for receiving audible commands and a radio frequency transmitter for transmitting said commands at a radio frequency via a fob antenna;

a receiver for positioning in a specific vehicle having features preselected from the variable feature content, said receiver having an antenna for receiving one of said commands at a radio frequency, a demodulator for recovering said one command and a processor for decoding said recovered one command and determining if the preselected features are compatible with the one command;

a network interface for controlling a vehicle system in accordance with said recovered one command only when the preselected features are compatible with the one command;

a transmitter for positioning in the vehicle, said transmitter transmitting result information to a receiver located in said fob, said fob further comprising an output device connected to said receiver wherein said output device communicates said result information to a fob user, said result information comprising an indication that a requested function could not be executed and a reason said requested function could not be executed.

* * * * *